(12) United States Patent
Wang et al.

(10) Patent No.: US 12,322,820 B2
(45) Date of Patent: Jun. 3, 2025

(54) ASSEMBLY FOR PROTECTING AN SMD COMPONENT FROM ENVIRONMENTAL INFLUENCES

(71) Applicant: TDK Electronics AG, Munich (DE)

(72) Inventors: Yongli Wang, Frauental (AT); Qirong Li, Zhongshan (CN); Masahiro Oishi, Deutschlandsberg (AT); Axel Pecina, St. Martin (AT)

(73) Assignee: TDK Electronics AG, Munich (DE)

( * ) Notice: Subject to any disclaimer, the term of this patent is extended or adjusted under 35 U.S.C. 154(b) by 526 days.

(21) Appl. No.: 17/638,025

(22) PCT Filed: Mar. 30, 2021

(86) PCT No.: PCT/EP2021/058314
§ 371 (c)(1),
(2) Date: Feb. 24, 2022

(87) PCT Pub. No.: WO2021/198267
PCT Pub. Date: Oct. 7, 2021

(65) Prior Publication Data
US 2022/0278409 A1 Sep. 1, 2022

(30) Foreign Application Priority Data
Apr. 2, 2020 (DE) .......................... 102020109247.4

(51) Int. Cl.
*H01M 50/24* (2021.01)
*H01M 10/0562* (2010.01)
*H01M 50/227* (2021.01)
*H01M 50/247* (2021.01)
*H01M 50/298* (2021.01)
*H01M 50/50* (2021.01)
*H01M 50/516* (2021.01)
*H01M 50/536* (2021.01)

(52) U.S. Cl.
CPC ....... *H01M 50/24* (2021.01); *H01M 10/0562* (2013.01); *H01M 50/227* (2021.01); *H01M 50/247* (2021.01); *H01M 50/50* (2021.01); *H01M 50/536* (2021.01); *H01M 50/298* (2021.01); *H01M 50/516* (2021.01)

(58) Field of Classification Search
None
See application file for complete search history.

(56) References Cited

U.S. PATENT DOCUMENTS 4,152,689 A 5/1979 Thompson
5,473,503 A 12/1995 Sakata et al.
(Continued)

FOREIGN PATENT DOCUMENTS

CN 104701009 A 6/2015
CN 204792436 U 11/2015
(Continued)

*Primary Examiner* — Jonathan Crepeau
(74) *Attorney, Agent, or Firm* — Slater Matsil, LLP

(57) ABSTRACT

In an embodiment an assembly includes at least one surface mounted device (SMD) component, a metallic wiring configured to lead current from the at least one SMD component to an external circuit and at least one protection element is configured to cover all outer surface of the at least one SMD component and at least parts of the metallic wiring, wherein the assembly has a structure of a molded module, and wherein the at least one SMD component includes a rechargeable all solid-state battery.

14 Claims, 1 Drawing Sheet

(56) References Cited

U.S. PATENT DOCUMENTS

| | | |
|---|---|---|
| 6,232,148 B1 | 5/2001 | Ma et al. |
| 6,518,501 B1 | 2/2003 | Kawahara et al. |
| 8,228,023 B2 | 7/2012 | Sather et al. |
| 2008/0241665 A1 | 10/2008 | Sano |
| 2009/0015988 A1 | 1/2009 | Kuriyama |
| 2009/0181297 A1 | 7/2009 | Ashizaki et al. |
| 2016/0172125 A1 | 6/2016 | Shin et al. |
| 2016/0017212 A1 | 7/2016 | Shin et al. |
| 2018/0020511 A1 | 7/2018 | Kodama |
| 2018/0205119 A1 | 7/2018 | Kodama |
| 2020/0083570 A1 | 3/2020 | Koestner et al. |
| 2020/0136219 A1 | 4/2020 | Koestner et al. |
| 2021/0167471 A1 | 6/2021 | Nishide et al. |

FOREIGN PATENT DOCUMENTS

| | | |
|---|---|---|
| CN | 205016385 U | 2/2016 |
| DE | 69417118 T2 | 10/1999 |
| DE | 102017111942 A1 | 12/2018 |
| JP | S6455295 A | 3/1989 |
| JP | H06151649 A | 5/1994 |
| JP | 2001196488 A | 7/2001 |
| JP | 2003224221 A | 8/2003 |
| JP | 2008103288 A | 5/2008 |
| JP | 2008251225 A | 10/2008 |
| JP | 2009170882 A | 7/2009 |
| JP | 2014116156 A | 6/2014 |
| JP | 2015220099 A | 12/2015 |
| JP | 2015220102 A | 12/2015 |
| JP | 2015220107 A | 12/2015 |
| WO | 2008100441 A2 | 8/2008 |
| WO | 2020031424 A1 | 2/2020 |

ASSEMBLY FOR PROTECTING AN SMD COMPONENT FROM ENVIRONMENTAL INFLUENCES

This patent application is a national phase filing under section 371 of PCT/EP2021/058314, filed Mar. 30, 2021, which claims the priority of German patent application 102020109247.4, filed Apr. 2, 2020, each of which is incorporated herein by reference in its entirety.

TECHNICAL FIELD

The present invention relates to an assembly for protecting an active SMD (Surface Mounted Device) component from environmental influences. Furthermore, the present invention relates to a method for preparing an assembly, wherein the assembly is adapted and arranged for protecting an SMD component from environmental influences.

BACKGROUND

Usually, SMD components (e.g. semiconductor elements) are protected by on-board coating, e.g. conformal coating, dam-fill coating, and/or top-glob coating after assembly with surface mounting technique (SMT). Alternatively, the individual elements or element groups are molded or coated with thermal plastic or epoxy materials for tight protection.

However, these techniques are rather adapted for passive components than for active components, which generally have a high energy density and, thus, cannot withstand the high temperature/pressure needed in a conventional soldering/coating/molding process.

For batteries containing atmosphere sensitive materials the protection is achieved by means of tight housing with special structure and materials, e.g. coin cells and/or pouch cells. The materials/structure used thereby are not fitting the SMT process and require manual soldering or special assembling technique (e.g. gluing, plug in the battery fixture), which generally leads to additional assembling costs and reduced reliability in mechanical/electrical connections with the printed circuit board (PCB).

CeraCharge battery, i.e. rechargeable solid-state SMD battery, performance is sensitive to the humidity of the environment. The recommended relative humidity is below 60% for the use of CeraCharge, which strongly limit the application of the product, and may introduce severe reliability issue for the product and related electronic devices under not well controlled ambient conditions.

SUMMARY

Embodiments provide an assembly and a method which solve the above mentioned problems.

According to a first embodiment of the present disclosure, an assembly is provided which is specifically adapted and designed for protecting an SMD component, in particular an active SMD component, from environmental influences, e.g. from humidity and/or chemical attacking.

The assembly comprises at least one SMD component, in particular at least one active SMD component. In one embodiment, the assembly comprises exactly one SMD component, preferably exactly one active SMD component. Alternatively, the assembly may comprise a plurality of (preferably active) SMD components, e.g. two, three or more SMD components. The SMD component is adapted to follow the standard EIA case size for SMD components.

The assembly further comprises a metallic wiring. In the following, the metallic wiring may also be referred to as wiring or electric wiring. The wiring may comprise at least one, preferably a plurality of, metallic wires or strips/foils, for example thin copper foils. The metallic wiring may comprise one, two or more metallic strip carriers. The metallic wiring is adapted and arranged to lead current from the SMD component to an external circuit, e.g. to a PCB.

The assembly further comprises at least one protection element. Preferably, the assembly comprises exactly one protection element. The protection element may comprise an epoxy resin, a thermal plastic material and/or materials based thereon.

The protection element is adapted and arranged to cover an outer surface, in particular all outer surface, of the SMD component. The protection element preferably envelops the SMD component completely. The protection element is further adapted and arranged to cover parts of the metallic wiring. The SMD component and the parts of the wiring covered by the protection element are molded with the protection element. Accordingly, the assembly has the structure of a molded module.

The tight coating by the molding protects the SMD component from humidity and chemical attacking in a cost-effective, simple and reliable way. By means of the coating structure more robustness and a higher reliability of the SMD component under not well controlled operation conditions is achieved. The dimensions of the whole module and the exposed metallic wiring is compatible to standard EIA case size for SMD components. All in all, a robust, efficient and simple assembly is provided which protects SMD components against environmental influences.

According to one embodiment, the wiring protrudes at least partly from the protection element for electrically connecting the assembly to an external circuit. In this way, a simple and reliable electrical connection of the whole assembly is ensured.

According to one embodiment, the protection element is adapted and arranged to enclose the SMD component completely. This brings about more robustness and higher reliability of the SMD component under not well controlled operation conditions (e.g. high humidity, chemical attacking).

According to one embodiment, the wiring, in particular the respective strip or foil, comprises a first section. The wiring, in particular the respective strip/foil, may comprise a second section. An intermediate section may be arranged between the first section and the second section. Of course, the wiring is a one-piece wiring. In other words, the sections of the wiring are built unitarily.

The first section may be exposed from the protection element. The first section of the wiring may be bent. A bending geometry of the first section may be adapted to the demand of application of the assembly and the related fabrication process. The first section may provide an external electrode of the assembly. In this way, the assembly may be easily electrically connected to an external circuit. The second section may be arranged within the protection element. The second section may be soldered to the SMD component.

According to one embodiment, the SMD component comprises at least one external electrode, preferably two external electrodes. The wiring, in particular the second section, is soldered to the external electrode.

According to one embodiment, the at least one SMD component comprises a rechargeable all solid-state battery, e.g. CeraCharge. By means of embedding the rechargeable all solid-state battery into the assembly, the rechargeable all solid-state battery can be operated under an environment of high humidity, e.g. ≥90% RH, and has enhanced reliability against unstable operating ambient conditions.

According to one embodiment, the assembly comprises two or more SMD components, e.g. all solid-state batteries. The SMD components may be soldered in parallel, in serial or in combined version to the metallic wiring. In this way, the capacity and voltage of the assembly can be tuned for broader application requirements.

According to a further embodiment, a method for preparing an assembly for protecting an SMD component from environmental influences is disclosed. The method comprises the following steps:

A first step A) comprises the preparation of at least one SMD component. Alternatively, more than one SMD components may be prepared, e.g. two or three SMD components.

The SMD component may be an active SMD component. The SMD component may, for example, comprise a rechargeable all solid-state battery, e.g. CeraCharge. However, the method is not limited to embed only rechargeable all solid-state batteries, but also combinations of rechargeable all solid-state batteries and/or other SMD components are possible.

The step of preparing the SMD component may comprise a conventional multilayer process including tape casting, screen printing, stacking, cutting, debinding, and sintering at high temperatures to form a monolithic multilayer ceramic component, which contains the desirable structure of a laminated charge collector, electrode material, and e.g. electrolyte material for a Li-ion battery. Afterwards, the ceramic component may be tumbled to round the sharp corners.

A next step B) comprises applying metallic layers on an outer surface of the SMD component for providing external electrodes. The metallic layers may comprise Cr, Ni and/or Ag. Accordingly, the respective external electrode may comprise Cr/Ni/Ag triple layers. At first, a Cr layer may be applied to the outer surface of the SMD component. Afterwards, a Ni layer may be applied onto the Cr layer. Afterwards, an Ag layer may be applied onto the Ni layer.

Preferably, two external electrodes are applied to the outer surface, e.g. opposite side faces, of the SMD component where inner electrode layers of the SMD component are exposed to the outside. The external electrodes may be applied to an underside, an upper side and/or to a side face of the SMD component. The external electrodes, in particular the layers of the respective external electrode, may be sputtered onto the outer surface of the SMD component.

In a next step C) an electric wiring is soldered to an outer surface, in particular to the Ag layer, of the respective external electrode to form an electric connection. The electric wiring may comprise two or more metallic strips/foils or metallic strip carriers, for example. The electric wiring may comprise two thin copper foils, for example. The electric wiring may be soldered to the external electrode with lead-free reflow soldering.

In a next step D) the SMD component and at least parts of the wiring are molded with a protection element such that the protection element encloses the SMD component completely. The protection element may comprise an epoxy material, a thermal plastic material and/or materials based on these two materials. The SMD component and parts of the wiring are embedded completely within the protection element. In this way, a molded module is formed.

In a next step E) at least a part of the wiring, i.e. a first section of the respective metallic strip/foil, is lead out of the protection element. The size of the molded module is controlled to be within the specification of an EIA SMD case size.

In a next step F) the part of the wiring exposed from the protection element, i.e. the first section, is bent and cut to form an external electrode of the complete molded module. The position and dimension of the residual metallic strip outside the module (i.e. the first section) is designed to fit the corresponding footprints of the same case size. In this way, the complete assembly, i.e. the molded module, can be easily electrically connected to a circuit board.

In a next step G) the assembly/the molded module is soldered onto a test PCB via a lead-free reflow process. Afterwards, the battery performance is measured at a high humidity of 93% RH at 40° C., and a continuous operation (charge/discharge cycling) is achieved. In contrast thereto, the maximum humidity for the continuous operation of a bare/conventional CeraCharge is limited to 60% RH.

The molded module not only inherits the intrinsic features of e.g. a rechargeable all solid-state battery, i.e. rechargeable, long life/cycling time, high safety, SMT compatible (lead-free reflow) and RoHS compatible, etc., but also extends the application field of the said component. The coating structure brings about more robustness and higher reliability of the all solid state battery under not well controlled operation conditions (e.g. high humidity, chemical attacking). Furthermore, with proper connection of more than one rechargeable all solid-state battery, the capacity and voltage of the component can be tuned for broader application requirements.

As mentioned above, the design is not limited to embed only rechargeable all solid-state batteries, but also combinations of rechargeable all solid-state batteries and/or other SMD components to provide more complicated functions. Accordingly, the shape and dimensions of the wiring and the complete module block can be adapted according to the requirement of applications and related fabrication process.

The present disclosure comprises several embodiments. Every feature described with respect to one of the embodiments is also disclosed herein with respect to the other embodiment, even if the respective feature is not explicitly mentioned in the context of the specific embodiment.

In particular, the present disclosure relates to the following embodiment:

1. An assembly for protecting an SMD component from environmental influences comprising
   at least one SMD component,
   a metallic wiring adapted and arranged to lead current from the SMD component to an external circuit,
   at least one protection element adapted and arranged to cover all outer surface of the SMD component and at least parts of the wiring,
   wherein the assembly has a structure of a molded module.

2. The assembly according to embodiment 1, wherein the wiring protrudes at least partly from the protection element for electrically connecting the assembly to an external circuit.

3. The assembly according to embodiment 1 or embodiment 2, wherein the protection element is adapted and arranged to enclose the SMD component completely.

4. The assembly according to any of the previous embodiments, wherein the wiring comprises at least two metallic strips or strip carriers.

5. The assembly according to any of the previous embodiments, wherein the SMD component comprises at least one external electrode, wherein the wiring is soldered to the external electrode.

6. The assembly according to any of the previous embodiments, wherein the at least one SMD component comprises a rechargeable all solid-state battery.

7. The assembly according to any of the previous embodiments, wherein the protection element comprises an epoxy resin, a thermal plastic material and/or materials based thereon.

8. The assembly according to any of the previous embodiments, wherein the wiring comprises a first section and a second section, the first section being exposed from the protection element and the second section being arranged within the protection element, wherein the first section provides an external electrode of the assembly.

9. The assembly according to embodiment 8, wherein the first section of the wiring is bent.

10. The assembly according to any of the previous embodiments, wherein the assembly comprises two or more SMD components, wherein the SMD components are soldered in parallel, in serial or in combined version to the metallic wiring.

11. A method for preparing an assembly for protecting an SMD component from environmental influences comprising the following steps:
A) Preparing the SMD component;
B) Applying external electrodes to the SMD component for providing an external contact of the SMD component;
C) Soldering an electric wiring to the external electrodes of the SMD component to form an electric connection;
D) Molding the SMD component and at least parts of the wiring with a protection element such that the protection element encloses the SMD component completely and such that a molded module is formed;
E) Leading at least a part of the wiring out of the protection element;
F) Bending and cutting the part of the wiring exposed from the protection element to form an external electrode of the molded module.

12. The method according to embodiment ii, wherein preparing the SMD component comprises a conventional multilayer process to form a monolithic multilayer ceramic SMD component.

BRIEF DESCRIPTION OF THE DRAWINGS

Further features, refinements and expediencies become apparent from the following description of the exemplary embodiments in connection with the figures.

In the figures, elements of the same structure and/or functionality may be referenced by the same reference numerals. It is to be understood that the embodiments shown in the figures are illustrative representations and are not necessarily drawn to scale.

DETAILED DESCRIPTION OF ILLUSTRATIVE EMBODIMENTS

Figure 1:
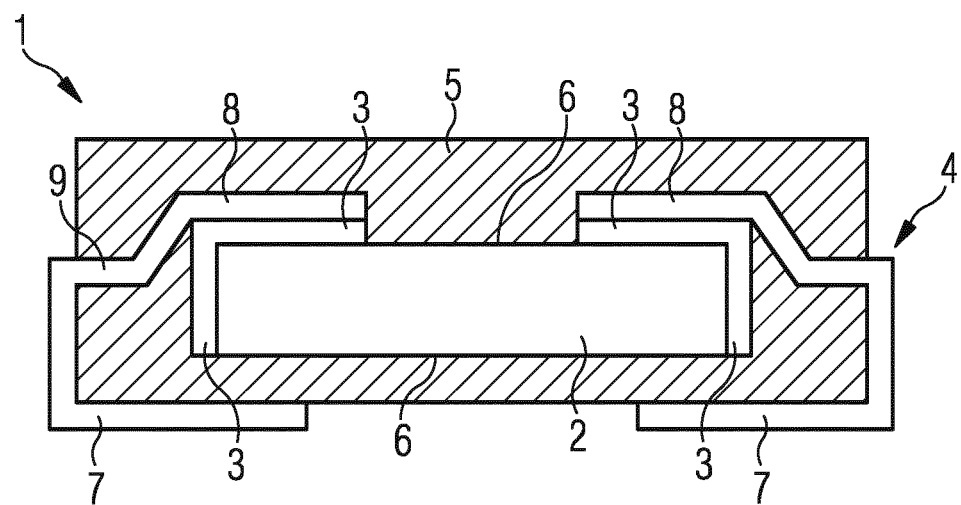
FIG. 1 schematically shows a sectional view of an assembly for protecting an SMD component against environmental influences.

FIG. 1 shows an assembly 1 for protecting a SMD component 2 against environmental influences. The assembly 1 comprises an SMD component 2. In this embodiment, the SMD component 2 comprises one single rechargeable all solid-state battery. However, also combinations of rechargeable all solid-state batteries and/or other SMD components are possible.

The SMD component 2 comprises a monolithic ceramic multilayer body with two external electrodes 3. The external electrodes 3 are located on an outer surface 6 of the SMD component 2. In this embodiment 3, the external electrodes 3 are applied to an upper face of the SMD component 2. However, the external electrodes 3 may also be located on different regions of the outer surface 6 of the SMD component 2, e.g. on opposite side faces or on a bottom side of the SMD component 2. The two external electrodes 3 are spatially and electrically separated from one another.

The respective external electrode 3 comprises a triple layer of Cr/Ni/Ag (not explicitly shown). However also different materials or combinations of materials are possible. The respective external electrode 3 is sputtered onto the SMD component 2.

The assembly 1 further comprises a metallic wiring 4. In this embodiment, the wiring 4 comprises two metallic strips or metallic foils. In particular, the wiring 4 comprises a thin copper foil. The strip/foil may be coated with tin to ease soldering.

The respective metallic strip/foil comprises a first section 7 and a second section 8. The second section 8 is arranged on the respective external electrode 3. In particular, the second section 8 is soldered to the external electrode 3, in particular to the top layer or Ag layer of the external electrode 3, e.g. by lead-free reflow soldering. The second section 8 is arranged in a flat or planar manner on the external electrode 3. In an intermediate section 9 between the first section 7 and the second section 8, the respective metallic strip/foil comprises at least one kink. In other words, the metallic strip/foil is bent. This serves for leading the respective metallic strip/foil, in particular the first section 7, in a region below the assembly 1 for electrically connecting the assembly 1 to a circuit board.

The assembly 1 further comprises a protection element 5. The protection element 5 comprises a molding material. The protection element 5 may comprise an epoxy raisin, a thermal plastic material or combinations of the said materials. The SMD component 2 is embedded completely within the protection element 5. In other words, the protection element 5 covers the complete outer surface 6 of the SMD component 2.

Moreover, parts of the metallic wiring 4, in particular the second section 8 and the intermediate section 9, are embedded within the protection element 5. Thus, the protection element 5 coats the SMD component 2, the second section 8 and the intermediate section 9 completely and tightly. The assembly of SMD component 2, metallic wiring 4 and protection element 5 comprises the structure of a molded module.

The first section 7 of the electric wiring 4 is, however, not covered by the protection element 5, but is lead out of the protection element 5 to lead current from the SMD component 2 to an external circuit (not explicitly shown). The first section 7 is bent and trimmed to provide a solderable external electrode of the whole assembly 1. In particular, the respective first section 7 is firstly lead along an outer side face of the assembly 1. Afterwards, the first section 7 is bent to lead along a bottom side of the whole assembly 1. In this way, the respective first section 7 functions as an external electrode of the assembly 1/molded module.

The bending geometry of the first section 7 depends on the size of the assembly 1, the method of preparing the assembly 1 and/or the way of fixing the assembly 1 to a circuit board (e.g. by lead-free reflow soldering). In particular, the shape and the dimension of the wiring 4 and of the whole module can be adapted according to the demands of applications and the related fabrication process.

The tight coating by the protection element 5 protects the SMD component 2 from humidity and any chemical attacking, and the metallic wiring 4 leads the current from the external electrodes 3 to the external circuit. The dimensions of the whole assembly 1 and the exposed metallic wiring (i.e. the first section 7) is compatible with the standard EIA case size for SMD components. The size of the assembly 1 is preferably within the specification of an EIA SMD case size. The position and the dimension of the residual metallic strip outside the molded module, i.e. the first section 7, is designed to fit the corresponding footprints of the same case size.

The described assembly 1 provides an SMT compatible, rechargeable all solid-state battery that can be operated under environment of high humidity (e.g. 90% RH), and has enhanced reliability against unstable operating ambient conditions. The design can be extended to embed a plurality of SMD components 2 which are connected by the metallic wiring 4 in parallel or in serial or in combined version.

Figure 2:
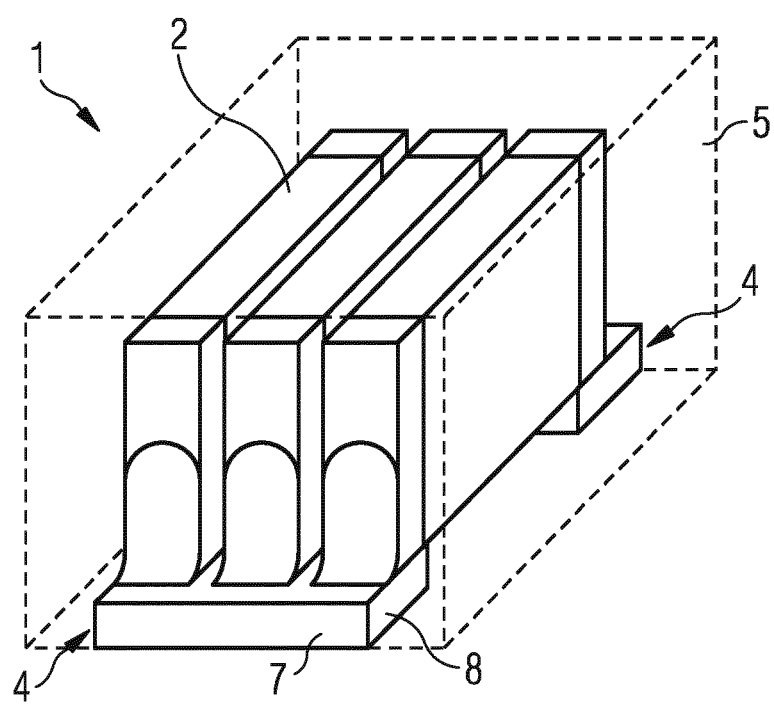
FIG. 2 schematically shows a perspective view of a further embodiment of the assembly.

FIG. 2 schematically shows a perspective view of a further embodiment of the assembly 1. In this embodiment, the assembly 1 comprises three SMD components 2 (preferably rechargeable all solid-state batteries). Of course, a different number of SMD components 2, e.g. two, four or more SMD components 2, are possible. The respective SMD component 2 is within the specification of an EIA SMD case size (e.g. 1812).

The three SMD components 2 are soldered to the metallic wiring 4. In this embodiment, the metallic wiring 4 comprises two carrier strips. The SMD components 2 are soldered in parallel to the carrier strips. Of course, the SMD components 2 may also be soldered in series to the carrier strips (not explicitly shown). Also a combined version is possible.

The SMD components 2 are molded with the protection element 5, which covers the three SMD components 2 completely. The first section 7 of the wiring 4 protrudes from the protection element 5 and serves as external electrode for the whole assembly 1. The second section 8 of the wiring 4 is embedded in the protection element 5.

The whole assembly/molded module comprises an EIA case 3225 with a height of 4.5 mm. The capacity of the assembly 1 is increased to 3 times as compared to a single SMD component 2/in particular a rechargeable all solid-state battery, while the inner resistance is reduced to ⅓ as compared to a single SMD component 2/in particular a rechargeable all solid-state battery. Accordingly, with proper connection of more than one SMD component 2, the capacity and voltage of the respective SMD component and of the assembly 1 can be tuned for broader application requirements.

In the following, a method for preparing an assembly 1 for protecting an SMD component 2 from environmental influences is disclosed. The method comprises the following steps:

In a first step A) at least one SMD component 2 is prepared. Alternatively, more than one SMD component 2 may be prepared, e.g. two or three SMD components 2. Preferably, the SMD component 2 comprises a rechargeable all solid-state battery. However, the method is not limited to embed only rechargeable all solid-state batteries, but also combinations of rechargeable all solid-state batteries and/or other SMD components are possible. The SMD component 2 comprises EIA case size 1812.

In this method step, a conventional multilayer process may take place including tape casting, screen printing, stacking, cutting, debinding, and sintering at high temperatures to form a monolithic multilayer ceramic component, which contains a laminated charge collector, electrode material, and, preferably, electrolyte material for a Li-ion battery. Afterwards, the ceramic component may be tumbled to round the sharp corners.

In a next step B) metallic layers are applied on an outer surface 6 of the SMD component 2 for providing external electrodes 3. The metallic layers may comprise Cr, Ni and/or Ag. In particular, the metallic layers may comprise Cr/Ni/Ag triple layers. The metallic layers are sputtered onto the outer surface 6 of the SMD component 2.

In a next step C) an electric wiring 4 is soldered to the external electrodes 3 of the SMD component 2 to form an electric connection. The electric wiring 4 may comprise two or more metallic strips/foils or metallic strip carriers, for example. The electric wiring 4 may be soldered to the respective external electrode 3 with lead-free reflow soldering.

In a next step D) the SMD component 2 and at least parts of the wiring 4 are molded with a protection element 5 such that the protection element 5 encloses the SMD component 2 completely. The protection element 5 may comprise an epoxy material, a thermal plastic material and/or materials based on these two materials. In this way, a molded module is formed.

In a next step E) at least a part of the wiring 4, i.e. a first section 7 of the wiring 4 is lead out of the protection element 5.

In a next step F) the part of the wiring 4 exposed from the protection element, i.e. the first section 7, is bent and cut to form an external electrode of the complete molded module/assembly. In this way, the assembly 1 can be easily electrically connected to a circuit board.

In a next step G) the assembly 1 is soldered onto a test PCB via a lead-free reflow process. Afterwards, the battery performance is measured at a high humidity of 93% RH at 40° C., and a continuous operation (charge/discharge cycling) is achieved. In contrast thereto, the maximum humidity for the continuous operation of a bare/conventional rechargeable all solid-state battery is limited to 60% RH.

The size of the assembly 1 is controlled to be within the specification of an EIA SMD case size 3225 (with a height of 3.2 mm). The position and dimension of the residual metallic strip outside the molded module (i.e. the first section 7 of the metallic wiring 4) is designed to fit the corresponding footprints of the same case size.

Although the invention has been illustrated and described in detail by means of the preferred embodiment examples, the present invention is not restricted by the disclosed examples and other variations may be derived by the skilled person without exceeding the scope of protection of the invention.

The invention claimed is:
1. An assembly comprising:
at least one surface mounted device (SMD) component;
a metallic wiring configured to lead current from the at least one SMD component to an external circuit; and
at least one protection element configured to cover all outer surfaces of the at least one SMD component and at least parts of the metallic wiring, wherein the assembly has a structure of a molded module, wherein the at least one SMD component comprises a rechargeable all solid-state battery, wherein the at least one SMD component comprises at least one external electrode, and wherein the metallic wiring is soldered to the external electrode.

2. The assembly according to claim 1, wherein the metallic wiring protrudes at least partly from the at least one protection element, and wherein the metallic wiring is configured for electrically connecting the assembly to the external circuit.

3. The assembly according to claim 1, wherein the at least one protection element is configured to completely enclose the at least one SMD component.

4. The assembly according to claim 1, wherein the metallic wiring comprises at least two metallic strips or strip carriers.

5. The assembly according to claim 1, wherein the metallic wiring comprises two or more metallic foils.

6. The assembly according to claim 1, wherein the at least one protection element comprises an epoxy resin, a thermal plastic material and/or materials based thereon.

7. The assembly according to claim 1, wherein the metallic wiring comprises a first section and a second section, the first section being exposed from the at least one protection element and the second section being arranged within the at least one protection element, and wherein the first section provides an external electrode of the assembly.

8. The assembly according to claim 7, wherein the first section of the metallic wiring is bent.

9. The assembly according to claim 1, wherein the assembly comprises two or more SMD components, wherein the SMD components are soldered in parallel, in series or in a combined version to the metallic wiring.

10. An assembly comprising:

at least one surface mounted device (SMD) component;

a metallic wiring configured to lead current from the at least one SMD component to an external circuit; and at least one protection element configured to cover all outer surfaces of the at least one SMD component and at least parts of the metallic wiring, wherein the assembly has a structure of a molded module, wherein the at least one SMD component comprises a rechargeable all solid-state battery, wherein the at least one SMD component comprises at least one external electrode and the metallic wiring comprises a first section and a second section, the first section being exposed from the at least one protection element and the second section being arranged within the at least one protection element, wherein the first section provides an external electrode of the assembly, wherein the second section is arranged on the respective external electrode, wherein the first section of the metallic wiring is bent, and wherein the metallic wiring is soldered to the external electrode.

11. The assembly according to claim 10, wherein the at least one protection element is configured to completely enclose the at least one SMD component.

12. The assembly according to claim 10, wherein the metallic wiring comprises at least two metallic strips or strip carriers.

13. The assembly according to claim 10, wherein the metallic wiring comprises two or more metallic foils.

14. The assembly according to claim 10, wherein the at least one protection element comprises an epoxy resin, a thermal plastic material and/or materials based thereon.

\* \* \* \* \*